United States Patent

[11] 3,593,151

[72] Inventor John R. Veale
London, England
[21] Appl. No. 752,072
[22] Filed Aug. 12, 1968
[45] Patented July 13, 1971
[73] Assignee Xerox Corporation
Rochester, N.Y.

[54] DETECTOR FOR RECEIVER PRINTER STARTUP
6 Claims, 2 Drawing Figs.

[52] U.S. Cl. .......... 325/466, 178/6, 178/6.6 R, 178/88 R, 340/171 R
[51] Int. Cl. .......... H04b 1/16, H04q 1/24
[50] Field of Search .......... 178/5, 6, 88, 6.6; 325/65, 466; 340/171

[56] References Cited

UNITED STATES PATENTS

| | | | |
|---|---|---|---|
| 3,353,102 | 11/1967 | Meyers | 178/88 |
| 3,434,056 | 3/1969 | Becker | 325/65 |
| 3,486,118 | 12/1969 | Sanders | 325/65 |

*Primary Examiner*—Bernard Konick
*Assistant Examiner*—Howard W. Britton
*Attorney*—James J. Ralabate

ABSTRACT: A detector for controlling the startup of a facsimile printing transducer. The detector includes a comparator which activates the transducer when a FM carrier signal of a first frequency is received and enables the facisimile transducer to continue operation until the carrier signal falls below a second frequency corresponding to an adjusted bias applied to the comparator input when the carrier signal of said first frequency is received.

INVENTOR.
JOHN R. VEALE
BY
AGENT

DETECTOR FOR RECEIVER PRINTER STARTUP

BACKGROUND OF THE INVENTION

The present invention relates to a carrier detector utilized in facsimile transceivers for transmitting the contents of a document to remote locations using standard telephone transmission facilities.

The function of a facsimile transceiver system is to scan documents at a transmit station and develop an electrical signal representative of the contents of the document. This electrical signal is then modulated into a form suitable for transmission over standard telephone transmission lines. The preferred form of modulation for such "base band" signals is to frequency modulate them at a low frequency in the audio range transmittable by ordinary telephone circuitry, preferably in the range of 1,500 Hz to 2,500 Hz.

The FM modulated signal is then coupled into standard telephone transmission lines and taken therefrom again at the receiving station to the same standard headsets that are used for regular voice transmission, so that no special jacks or other electrical hookups are required. At the receiving station the above-mentioned FM-modulated facsimile signal is demodulated to provide an electrical signal that operates a printing device. The printing device then reproduces the contents of the document originally scanned at the transmit station. In prior art facsimile systems, one of the conditions necessary to start the print device is the reception of a signal indicating that a carrier signal of 1,400 Hz. or above has been transmitted. The receiver mode of these facsimile transceivers were permitted to remain in the state where it could start to operate in response to ambient acoustical noise signals received by a coupler. The frequency properties of a spurious noise signal within the usable range of the carrier is such that it had the capability of causing false starts of the printing device.

SUMMARY OF THE INVENTION

The present invention provides a start-signal detector which activates the printing transducer in a facsimile system when a transmitted FM carrier signal is received. The detector prevents the facsimile receiver from having false starts when a noise signal in the usable range of the carrier is present by operating on two signal frequencies. The detector in the present invention monitors the FM input carrier signal and activates a print transducer motor when a 2,200 Hz. or greater carrier signal is detected. The motor, which rotates the transducer scanning drum, subsequently remains on as long as the carrier is at a frequency above 1,400 Hz. The detector includes a transistor comparator which is biased initially to correspond to a 2,200 Hz. carrier signal and when this carrier signal is received, the comparator generates an output signal which causes the printing transducer motor to be energized. Simultaneously, the bias applied to the input of the comparator is adjusted to a new value equal to the sum of the initial bias and a bias voltage obtained from a power supply energized by the initially received 2,200 Hz. carrier signal. The comparator is now biased so that a carrier signal of a frequency of 1,400 Hz. or greater will maintain the generation of the output signal.

An object of the present invention is to provide apparatus for preventing false startups of printing transducers.

It is another object of the present invention to provide a novel FM carrier detector which prevents noise or other spurious signals from starting a printing transducer.

It is a further object of the present invention to provide novel circuitry for preventing false startups of a printing transducer located at a facsimile receiver, the circuitry including a semiconductor comparator circuit and means for adjusting the bias level thereto.

It is still a further object of the invention to provide a novel semiconductor FM carrier detector which initiates operation of a printing transducer at one carrier frequency and maintains operation for subsequently received carrier signals above another carrier frequency.

DESCRIPTION OF THE DRAWING

Other objects and features of the present invention will become apparent from the following detailed description when taken in conjunction with the drawings in which.

DESCRIPTION OF THE PREFERRED EMBODIMENTS

Figure 1:
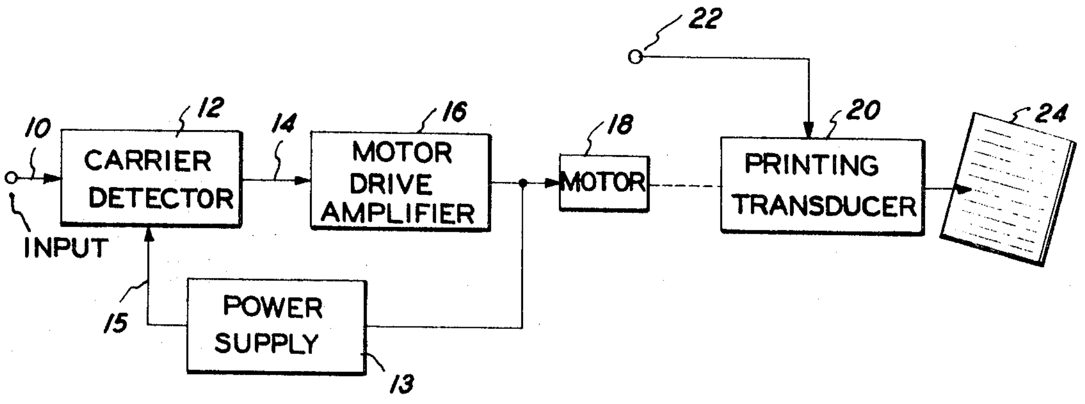
FIG. 1 is a block diagram representation of a portion of a facsimile receiving system.

Referring now to FIG. 1, there is shown a block diagram of a portion of the receiving end of a facsimile transmission system. The signal applied to the carrier detector 12 via input lead 10 is derived from the FM carrier by limiting and squaring the carrier waveform, phase splitting the squared signal, differentiating each leading and trailing edge of the squared signal phases, and gating the negative going differentials of each phase to provide constant width pulses at double the frequency of the input FM. The output of carrier detector 12 is applied to the motor drive amplifier 16 via lead 14. The motor drive amplifier 16 controls an electrical motor 18, preferably of the hysteresis-synchronous variety, and power supply 13, the amplifier deriving its control signals from a frequency standard, such as that provided by a crystal-controlled oscillator or other highly accurate frequency source, and the carrier reception indication signal appearing on lead 14. When activated, motor 18 drives the scanning drum of printing transducer 20. The demodulated FM video signal is applied to terminal 22 and then to transducer 20. The appearance of an output on lead 14 indicating the reception of the carrier signal of 2,200 Hz. and the demodulated FM video signal on terminal 22 causes the contents of a document scanned at the transmitter location to be reproduced upon copy paper 24. When a 2,200 Hz. carrier signal is detected, the output on lead 14 causes the motor drive amplifier 16 to enable power supply 13, initially generating a zero output, to generate a voltage level to detector 12 via lead 15. This voltage level enables the detector to generate a signal on lead 14 when a carrier signal above 1,400 Hz. is received.

Figure 2:
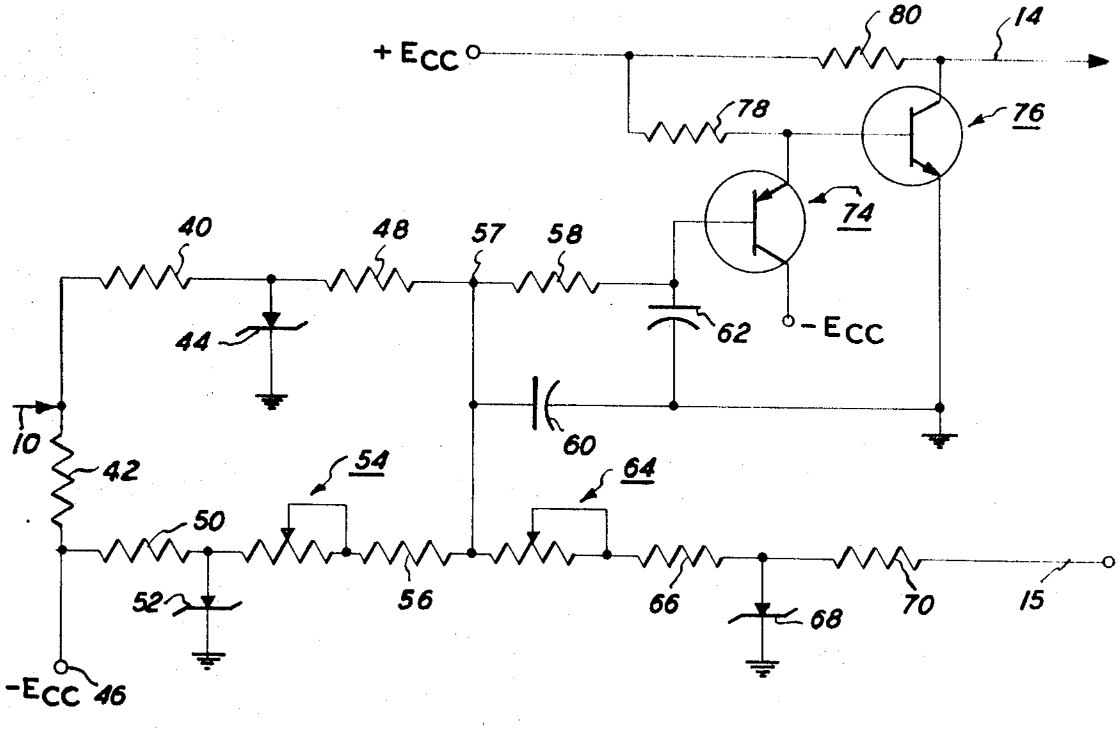
FIG. 2 is a schematic diagram of the detector circuit of the present invention.

Referring now to FIG. 2, there is shown a schematic diagram of a circuitry used in the FM carrier detector of the present invention.

The pulses appearing on input lead 10, and as described with reference to one terminal of FIG. 1, are applied to resistor 40 and one terminal of resistor 50 via resistor 42. A source of negative potential Ecc is applied to terminal 46. The other terminal of resistor 40 is connected to the anode of Zener diode 44, the cathode of which is grounded. The other terminal of resistor 50 is connected to the anode of Zener diode 52. The anode of Zener diode 44 is coupled to one terminal of resistor 58 and to one plate of capacitor 60 via resistor 48 and junction 57. The other terminal of resistor 58 and the other plate of capacitor 60 are coupled across the plates of capacitor 62, one plate of which is connected to the base of transistor 74, the other plate being grounded, the anode of Zener diode 52 is coupled to one plate of capacitor 60 and to one terminal of potentiometer 64 via potentiometer 54 and resistor 56. The other terminal of potentiometer 64 is connected to the anode of Zener diode 68 via resistor 66. Input lead 15 is coupled to the anode of diode 68 via resistor 70. PNP transistor 74 is connected in a common collector configuration, the base thereof being connected to −Ecc and the emitter to +Ecc via resistor 78. The emitter of transistor 74 is directly connected to the base of NPN transistor 76, connected in a grounded emitter configuration. The collector of transistor 76 is coupled to +Ecc via resistor 80. The output of the carrier detector 12 appears on lead 14, which is connected to the collector of transistor 76.

In operation, a negative bias voltage is initially applied to the emitter-base junction of transistor 74, transistor 74 thereby being initially biased off. Transistor 76 is initially biased to saturation by positive source of potential +Ecc. The bias voltage appearing across the emitter-base junction of transistor 74 is a function of the voltage across capacitor 62. This latter voltage is dependent upon the sum of the voltages applied to junction 57. In the embodiment illustrated, transistors 74 and 76 act essentially as a comparator. The combination of −Ecc, resistors 50 and 56, potentiometer 54 and Zener diode 52, the diode acting as a voltage regulator, adjusts the DC level of the initial voltage across capacitor 62 so that the bias on transistor 74 is such that a pulse of 4,400 Hz. or greater, corresponding to a carrier frequency of 2,200 Hz. received at input 10 will cause transistor 76 to switch to cutoff.

Input pulses appearing on line 10 are amplitude limited by Zener diode 44 and averaged by a low-pass filter comprised of resistors 48 and 58 and capacitors 60 and 62. The averaged pulses are applied to the base of transistor 74 at the output of capacitor 62. An input pulse train of 4,400 Hz. or greater causes the DC level of the capacitor output to decrease from its initial value, thereby lowering the base-to-emitter junction voltage of transistor 74 so that transistor 74 is now biased to conduction and the emitter thereof switches towards a less positive voltage. This negative change in voltage is directly coupled to the base of transistor 76, driving it to cutoff. The initial zero voltage appearing at the collector of transistor 76 now approaches +Ecc and is transmitted via lead 14 to motor drive amplifier 16 (FIG. 1) activating power supply 13 which switches from an initial zero voltage output on lead 15 to a negative voltage level, such as a −8 volt output. The switching of power supply 13 from a zero to negative level upon receipt of a logic level signal from amplifier 16 can be accomplished by any one of a number of techniques available to those skilled in the art. One such technique utilizes an electromagnetic switch to alternately connect lead 15 to a negative source of potential or to ground depending upon the output of amplifier 16. The negative regulated voltage appearing across Zener diode 68 is applied across capacitor 62 and the bias potential of transistor 74 is now less negative so that a carrier input having a frequency of 1,400 Hz. or greater will maintain transistor 76 in its cutoff condition. A carrier frequency below 1,400 Hz. will switch the transistors to their initial states and deenergize print transducer 20.

Representative values of circuit components schematically illustrated in FIG. 2 are listed hereinbelow Transistor 74 is type 2N3906.
Transistor 76 is type 2N3904
Zener diodes 44 and 52 are types 1N759A rated at 12 volts.
Zener diode 68 is type 1N752A rated at 5.6 volts.
Resistor values are as follows:
R40, 4.7 K. (kilohms).
R42, 10K.
R48, 39K.
R50, 3.3K.
R54, 50K.
R56, 56K.
R58, 16K.
R64, 50K.
R66, 82K.
R70, 1K.
R78, 470K.
R80, 24K.

Capacitors 60 and 62 are 5 $\mu$f. (microfarads) and rated at 15 volts DC.

Ecc, +18 volts

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What I claim is:

1. Apparatus for generating a signal indicating that a signal of a frequency within a predetermined frequency range has been received comprising:

comparator means for generating said indicating signal when the signal received at the input thereof is of a frequency equal to a frequency corresponding to the bias signals applied to said input, first means for generating a first bias signal corresponding to a signal of a first frequency within said predetermined frequency range and connected to the input of said comparator means, second means connected to said comparator means input for generating a second bias signal corresponding to a signal of a second frequency when a signal of said first frequency is received, means for coupling said indicating signal to said second generating means, the bias signal applied to the input of said comparator means being equal to the sum of said first and second bias signals after a signal of said first frequency is received.

2. The apparatus as defined in claim 1 wherein the indicating signal is maintained if a subsequently received signal is of a frequency equal to or greater than a frequency corresponding to the sum of said first and second bias signals.

3. The apparatus as defined in claim 2 wherein the indicating signal is removed if a subsequently received signal is of a frequency less than a frequency corresponding to the sum of said first and second bias signals.

4. A method of generating a signal indicating that a signal of a frequency within a predetermined frequency range has been received comprising the steps of:

a. comparing a signal derived from a received signal having a first frequency with a bias signal corresponding to a second frequency within said predetermined frequency range, b. generating said indicating signal at the output of said comparator when said first frequency equals said bias signal, c. producing a second bias signal when said indicating signal is generated, and d. comparing a signal derived from a subsequently received signal with a bias signal equal to the sum of said first and second bias signals, said first and second bias signals corresponding to a third frequency within said predetermined frequency range, said indicating signal being generated when said signal derived from said subsequently received signal is at least equal to said third frequency.

5. The method as defined in claim 4 wherein said indicating signal is maintained if said signal derived from said subsequently received signal is of a frequency equal to or greater than a frequency corresponding to the sum of said first and second bias signals.

6. The method as defined in claim 5 wherein said indicating signal is removed if said signal derived from said subsequently received signal is of a frequency less than a frequency corresponding to the sum of said first and second bias signals.